(12) United States Patent
Nishida et al.

(10) Patent No.: US 9,969,443 B2
(45) Date of Patent: May 15, 2018

(54) REINFORCING STRUCTURE OF VEHICLE BODY

(71) Applicant: MAZDA MOTOR CORPORATION, Hiroshima (JP)

(72) Inventors: Kenji Nishida, Hiroshima (JP); Kohya Nakagawa, Aki-gun (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 0 days. days.

(21) Appl. No.: 15/598,649

(22) Filed: May 18, 2017

(65) Prior Publication Data

US 2018/0022396 A1 Jan. 25, 2018

(30) Foreign Application Priority Data

Jul. 21, 2016 (JP) ................................ 2016-143295

(51) Int. Cl.
*B62D 29/04* (2006.01)
*B62D 25/20* (2006.01)
*B62D 21/02* (2006.01)

(52) U.S. Cl.
CPC ........... *B62D 29/041* (2013.01); *B62D 21/02* (2013.01); *B62D 25/20* (2013.01); *B60Y 2306/09* (2013.01)

(58) Field of Classification Search
CPC .. B62D 25/20; B62D 29/041; B62D 25/2009; B60Y 2306/09
USPC ...................................................... 296/204
See application file for complete search history.

(56) References Cited

U.S. PATENT DOCUMENTS

| | | | | |
|---|---|---|---|---|
| 7,134,710 | B2 * | 11/2006 | Kamura ................. | B62D 21/10 296/1.03 |
| 9,281,505 | B2 * | 3/2016 | Hihara ..................... | B60K 1/04 |
| 2012/0104793 | A1 * | 5/2012 | Danielson ............ | B62D 29/046 296/181.1 |
| 2015/0137558 | A1 * | 5/2015 | Ayuzawa ........... | B62D 25/2036 296/193.07 |
| 2015/0158532 | A1 * | 6/2015 | Ayuzawa ........... | B62D 25/2009 296/193.07 |
| 2016/0075381 | A1 * | 3/2016 | Keller .................... | B62D 21/11 280/795 |
| 2016/0137226 | A1 * | 5/2016 | Wolf ...................... | B62D 25/20 296/203.01 |

(Continued)

FOREIGN PATENT DOCUMENTS

JP  2015-174611 A  10/2015
JP  2017-061170 A  3/2017

*Primary Examiner* — Pinel E Romain
(74) *Attorney, Agent, or Firm* — Studebaker & Brackett PC

(57) ABSTRACT

There are provided a floor panel, a tunnel portion which is provided to protrude at the floor panel, a pair of right-and-left tunnel side frames, a pair of right-and-left floor frames, and a band plate which is made from carbon fiber reinforced plastic, an inward end portion which being connected to the tunnel side frame and an outward end portion of which being connected to the floor frame, wherein the band plate portion includes a first displacement following portion which is configured to be displaced, following displacement of the tunnel side frame and a second displacement following portion which is configured to be displaced, following displacement of the floor frame, and the first displacement following portion and the second displacement following portion are configured to be asymmetrical relatively to a longitudinal-directional axis.

14 Claims, 7 Drawing Sheets

(56) References Cited

U.S. PATENT DOCUMENTS

2017/0158039 A1\* 6/2017 Nakamura ............... B60K 1/04

\* cited by examiner

REINFORCING STRUCTURE OF VEHICLE BODY

BACKGROUND OF THE INVENTION

The present invention relates to a reinforcing structure of a vehicle body, and in particular relates to the reinforcing structure of the vehicle body in which the vehicle body is reinforced by a band plate which is made from synthetic resin and into which a reinforcing material is incorporated.

Conventionally, it is known that a panel member, such as a floor panel, a bonnet (engine hood), a trunk lid, or a roof panel, tends to be easily deformed by a force inputted from a suspension or the like. Especially, since the floor panel which forms a bottom face of a cabin is provided with a tunnel portion which protrudes in the cabin and extends in a longitudinal direction at a central portion, in a vehicle width direction, of the floor panel, the rigidity of this floor panel is lower than that of a flat-plate structure without the tunnel portion, which causes an increase of a membrane (film) vibration that the floor panel is displaced vertically. This vibration increase of the floor panel causes a cabin noise, so that there is a concern that the riding comfortability may be deteriorated.

In these days, carbon fiber reinforced plastic (CFRP) has been widely used as a structural material of airplanes, vehicles or the like because it has the material property of having a high strength ratio (strength/specific gravity) and a high rigidity ratio (rigidity/specific gravity), that is, being light weighted and strong/stiff. Since this carbon fiber reinforced plastic is configured such that carbon fiber shares the aerodynamics property of strength and the like and base material resin (matrix) shares the stress transmission function between carbon fibers and the protection function of carbon, the carbon fiber reinforced plastic is an anisotropic material of having greatly different physical properties in direction of a fiber direction and an non-fiber direction (a load's burden direction). The present applicant has proposed technologies that the carbon fiber reinforced plastic is used as the reinforcing material of the vehicle body based on the above-described knowledge.

A panel structure for a vehicle of Japanese Patent Laid-Open publication No. 2015-174611 comprises a damping (attenuation) panel member which is connected to a side sill and a second floor frame at four corners thereof, wherein the damping panel member includes a panel-shaped synthetic-resin made viscoelastic member and a carbon fiber member which is embedded in the viscoelastic member, fixed at four corners of the damping panel member, has a higher rigidity than the viscoelastic member, and arranged in a longitudinal direction. Thereby, an undercover to insulate noise from the outside is constituted and also the membrane vibration which is generated at the undercover itself is damped (reduced). A vehicle-body reinforcing structure of Japanese Patent Laid-Open publication No. 2017-061170 is that respective both end portions, in a longitudinal direction, of plural band plates which are made from the carbon fiber reinforced plastic and into which carbon fibers are incorporated in a state of being arranged in a longitudinal direction are respectively connected to vehicle-body-side connection portions which are provided below a floor panel, being spaced apart from in a vehicle longitudinal direction and a vehicle width direction. Thereby, damping of the vibration generated at a whole part of the vehicle body is attained.

In general, the vibration energy inputted to the band plate made from the carbon fiber reinforced plastic is transferred to the strain energy and the kinetic energy, and this strain energy is temporarily stored inside a member as shearing strain. Then, the stored strain energy (shearing strain) is transferred to the kinetic energy again. Herein, part of the strain energy is transferred to the heat energy, which is dissipated. Therefore, by increasing the strain energy stored inside the band plate, the dissipated heat energy cab be increased, so that the vibration damping performance of the vehicle can be increased. FIG. 10 shows a partial enlarged view of the carbon fiber reinforced plastic in a state before a torsional moment is applied, and FIG. 11 shows a partial enlarged view of the carbon fiber reinforced plastic in a state after the torsional moment has been applied. As shown in FIGS. 10 and 11, according to the reinforcing structure of the above-described second patent document, when the torsional moment based on the vibration energy of the floor panel is applied to the band plate, carbon fibers C are twisted and deformed independently, so that a base material M which exists between the carbon fibers C has shearing deformation. However, since the amount of the base material M between the carbon fibers C is very small, the shearing strain occurs increasingly at the base material M between the carbon fibers C and the stain energy stored inside the base material M is increased accordingly.

A move mode of a vehicle body which influences the riding comfortability of a passenger is classified into the two basically. The first vehicle-body mode is a vehicle-body torsional mode. This vehicle-body torsional mode is a torsional displacement move of the vehicle body itself which is caused by a phase delay based on the torsional moment around a vehicle-body central axis generated during the vehicle cornering, which is the vehicle-body mode related to the rigidity. The second vehicle-body mode is a membrane vibration mode. This membrane vibration mode is a vertical displacement move of the floor panel which is generated when the vehicle rides on projections existing on a road surface or the vehicle travels on a rough road, which is the vehicle-body mode related to the vibration.

According to the vehicle-body reinforcing structure of the above-described second patent document, the vehicle-body torsional mode generated at the whole part of the vehicle body is suppressed by the band plate connecting a pair of right-and-left tunnel side frames in the vehicle width direction, and also the membrane vibration mode generated at the floor panel is suppressed by the band plate connecting the tunnel side frame and a floor frame in the vehicle width direction. However, since the carbon fiber reinforced plastic is the anisotropic material in which a torsional-loss coefficient is three times greater than a bending-loss coefficient, there is room for further improving the vibration damping performance (the strain-energy storing capacity) of the band plate of the vehicle-body reinforcing structure of the above-described second patent document.

Since the band plate connecting the tunnel side frame and the floor frame of the above-described second patent document is deformed in a substantially similar manner to the floor panel, the torsional deformation substantially similar to the floor panel and the out-of-plane deformation in a direction perpendicular to the band plate occur. Therefore, even if the carbon fiber reinforced plastic making the band plate has the high strain-energy storing capacity as physical properties of the material itself, in a case where the band plate performs the same deformation move as the floor panel (or the flame member connected to the floor panel), only the amount of strain energy which corresponds to the torsional deformation accompanying this move is stored inside the band plate, so that the vibration damping performance of the band plate may not be effectively utilized.

SUMMARY OF THE INVENTION

An object of the present invention is to provide a reinforcing structure of a vehicle body which can effectively utilize the vibration damping performance of the synthetic-resin made band plate, into which the reinforcing material is incorporated.

The present invention is a reinforcing structure of a vehicle body, comprising a floor panel, a tunnel portion provided to protrude toward a cabin at a middle portion, in a vehicle width direction, of the floor panel, a pair of first frames provided to extend in a longitudinal direction on outward sides, in the vehicle width direction, of the tunnel portion, a pair of second frames provided to extend in the longitudinal direction on outward sides, in the vehicle width direction, of the pair of first frames, and a band plate which is made from synthetic resin and into which a reinforcing material is incorporated, an inward end portion, in the vehicle width direction, of which being connected to one of the first frames which is positioned on one side in the vehicle width direction and an outward end portion, in the vehicle width direction, of which being connected to one of the second frames which is positioned on one side in the vehicle width direction, wherein the band plate includes a first displacement following portion which is configured to be displaced, following displacement of an overlap portion of the first frame which overlaps the inward end portion of the band plate, and a second displacement following portion which is configured to be displaced, following displacement of an overlap portion of the second frame which overlaps the outward end portion of the band plate, and the first displacement following portion and the second displacement following portion are configured to be asymmetrical relatively to a longitudinal-directional axis.

According to the present invention, since the band plate includes the first displacement following portion which is configured to be displaced, following displacement of the overlap portion of the first frame which overlaps the inward end portion of the band plate, and the second displacement following portion which is configured to be displaced, following displacement of the overlap portion of the second frame which overlaps the outward end portion of the band plate, deformation moves of the first frame and the second frame can be generated at the band plate. Since the first displacement following portion and the second displacement following portion are configured to be asymmetrical relatively to the longitudinal-directional axis, the out-of-plane deformation which is generated at the band plate, which is caused by an angular displacement of the first frame and the second frame, can be transferred to the torsional deformation, so that the strain energy which is stored at the band plate can be increased.

In an embodiment of the present invention, the first and second displacement following portions include first and second pressing members which respectively press the inward and outward end portions against the first and second frames.

According to this embodiment, the difference in the longitudinal length between the first and second displacement following portions can be set to be properly large with a simple structure.

In another embodiment of the present invention, a longitudinal length of the second pressing member is set to be greater than that of the first pressing member.

According to this embodiment, the longitudinal length of the first displacement following portion which is positioned on the inward side in the vehicle width direction and has a large angular displacement can be smaller than that of the second displacement following portion, so that the torsional deformation of the band plate can be increased, maintaining the structural superiority.

In another embodiment of the present invention, the band portion contains plural carbon fibers as the reinforcing material, which are arranged in the synthetic resin, extending in a longitudinal direction of the band plate.

According to this embodiment, the vibration damping performance can be improved, increasing the rigidity of the longitudinal direction of the band plate.

In another embodiment of the present invention, the first and second displacement following portions are provided to be offset, in the longitudinal direction, from each other.

According to this embodiment, even in a case where the first and second displacement corresponding portions have the same longitudinal length, the torsional deformation of the band plate can be increased.

In another embodiment of the present invention, the first frames are a pair of right-and-left tunnel side frames, and the second frames are a pair of right-and-left floor frames.

According to this embodiment, the vibration damping of the floor panel can be effectively attained.

In another embodiment of the present invention, a pair of right-and-left band plates are provided to respectively connect the pair of right-and-left tunnel side frames and the pair of right-and-left floor frames as the band plate, and the pair of right-and-left band plates are integrally formed via a connection reinforcement portion which connects respective inward end portions, in the vehicle width direction, of the band plates.

According to this embodiment, by connecting the both end portions, in the vehicle width direction, of the tunnel portion, the membrane vibration mode can be damped (reduced), suppressing an opening move, in the vehicle width direction, of the tunnel portion, which is caused by the vehicle-body torsional mode.

Other features, aspects, and advantages of the present invention will become apparent from the following description which refers to the accompanying drawings.

DETAILED DESCRIPTION OF THE INVENTION

Hereafter, embodiments of the present invention will be described specifically referring to the accompanying drawings. The flowing description exemplifies the present invension which is applied to a lower vehicle-body structure, which should not limit the present invention, and applications or uses of the present invention. In the figures, an arrow F shows a forward side, an arrow L shows a leftward side, and an arrow U shows an upward side.

Embodiment 1

Figure 1:
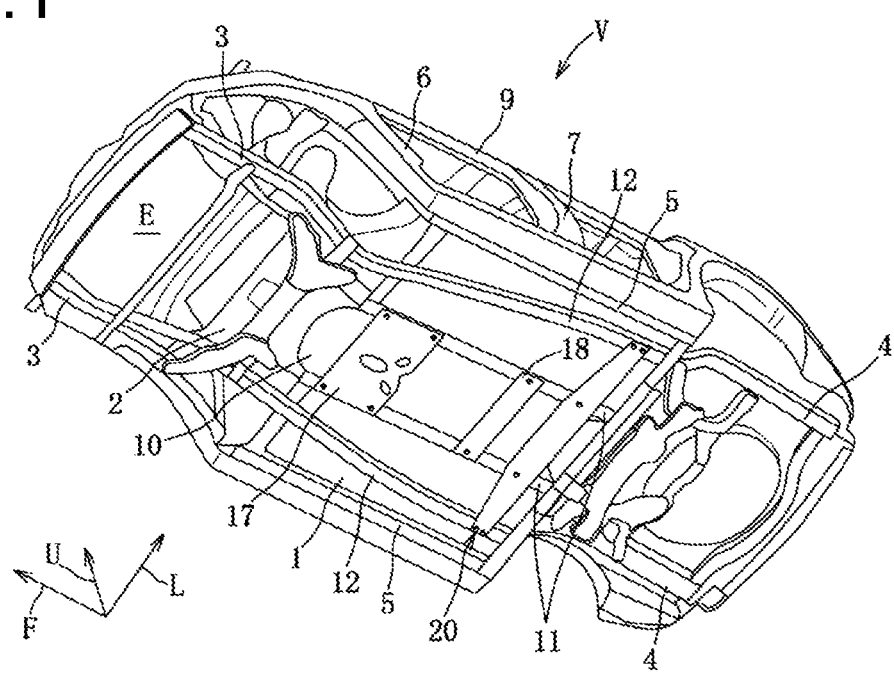
FIG. 1 is a view of a vehicle according to a first embodiment, when viewed from obliquely downward.
Figure 2:
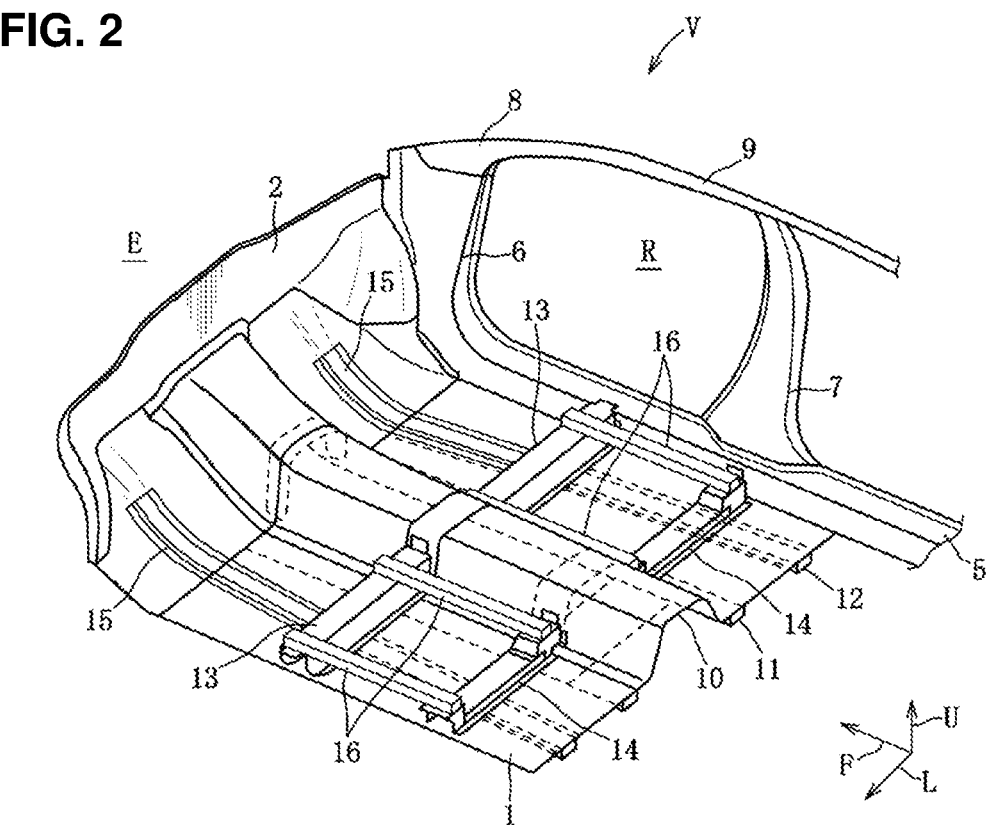
FIG. 2 is a view of a cabin, when viewed from obliquely rearward.

Hereafter, a first embodiment of the present invention will be described referring to FIGS. 1-7. A body structure of a vehicle V will be described first. As shown in FIGS. 1 and 2, the vehicle V is made of a monocoque type body, and comprises a floor panel 1 which forms a bottom face of a cabin R, a dash panel 2 which is provided to rise upward from a front end portion of the floor panel 1 and partitions the cabin R from an engine room E, a pair of right-and-left front side frames 3 which extend forward from the dash panel 2, a pair of right-and-left rear side frames 4 which extend rearward from side portions of a rear end of the floor panel 1, and others.

The vehicle V further comprises a pair of right-and-left side sills 5 which are provided at right-and-left both end portions of the side sills 5, a pair of right-and-left hinge pillar 6 which extend upward from respective front end portions of the side sills 5, a pair of right-and-left center pillar 7 which extend upward from respective middle portions of the side sills 5, a pair of right-and-left front pillars 8 which extend obliquely rearward and upward from respective upper end portions of the hinge pillars 6, a pair of right-and-left roof side rails 9 which extend rearward from respective rear end portions of the front pillars 8 and are connected to respective upper end portions of the center pillars 7, and others.

Next, the floor panel 1 will be described. As shown in FIGS. 1-4, the floor panel 1 is formed in a roughly-rectangular shape in a plan view, and includes a tunnel portion 10 which is provided to extend longitudinally and protrude toward the cabin R at a central portion in the vehicle width direction, thereof. A pair of tunnel side frames 11 (first frames) which are provided at right-and-left both end portions of the tunnel portion 10, and extend longitudinally and have a hat-shaped cross section, respectively. This tunnel side frame 11 cooperates with a lower face of the floor panel 1 to form a closed cross section which has a roughly-rectangular shape and extends longitudinally substantially in parallel to the floor panel 1.

A pair of right-and-left floor frames 12 (second frames) which have a roughly-hat shaped cross section extending longitudinally are provided between the pair of right-and-left side sills 5 and the pair of right-and-left tunnel frames 11, respectively. This floor frame 12 is provided to extend obliquely such that its rear side is positioned on an outward side, in the vehicle width direction, of the vehicle body, and cooperates with the lower face of the floor panel 1 to form a closed cross section which extends longitudinally and has a roughly-rectangular shape. A front end portion of the floor frame 12 is connected to a rear end portion of the front side frame 3, and its rear end portion is connected to a front end portion of the rear side frame 4. Plural nuts n1, n2 for fixing first—third brace members 17, 18, 20, which will be described later, are stored in the closed cross sections of the tunnel side frame 11 and the floor frame 12, and welded to respective bottom wall portions of the frames 11, 12.

The floor panel 1 includes cross members 13, 14 which extend laterally in the cabin R, straddling the tunnel portion 10, respectively. These cross member 13, 14 have a roughly-hat shaped cross section, respectively, and cooperate with an upper face of the floor panel 1 to form a roughly-rectangular closed cross section extending laterally over a range from a side wall portion of the tunnel portion 10 to a side wall portion of the side sill 5, respectively. The cross member 13 is arranged at a position which corresponds to a middle portion between the hinge pillar 6 and the center pillar 7, and a rear end portion of an upper frame 15 which is joined to a front-end side portion of the floor frame 12 via the floor panel 1 is connected to a front wall portion of the cross member 13. The cross member 14 is arranged substantially in parallel to the cross member 13 and located at a position which corresponds to the center pillar 7.

A pair of right-and-left front seats (not illustrated) are installed inside the cabin R. Each seat comprises a seat frame (not illustrated) for securing the strength/rigidity of the seat, and supported at a pair of right-and-left seat rails 16 so as to slide in the longitudinal direction. As shown in FIG. 2, the outward seat rail 16 is fixed to an outward portion of the cross member 13 at its front end portion, and fixed to a rearward portion of the cross member 14 at its rear end portion. Likewise, the inward seat rail 16 is fixed to an inward portion of the cross member 13 at its front end portion, and fixed to an inward portion of the cross member 14 at its rear end portion. A first brace member 17, a second brace member 18, and a third brace member 20 are arranged below the floor panel 1.

Figure 3:
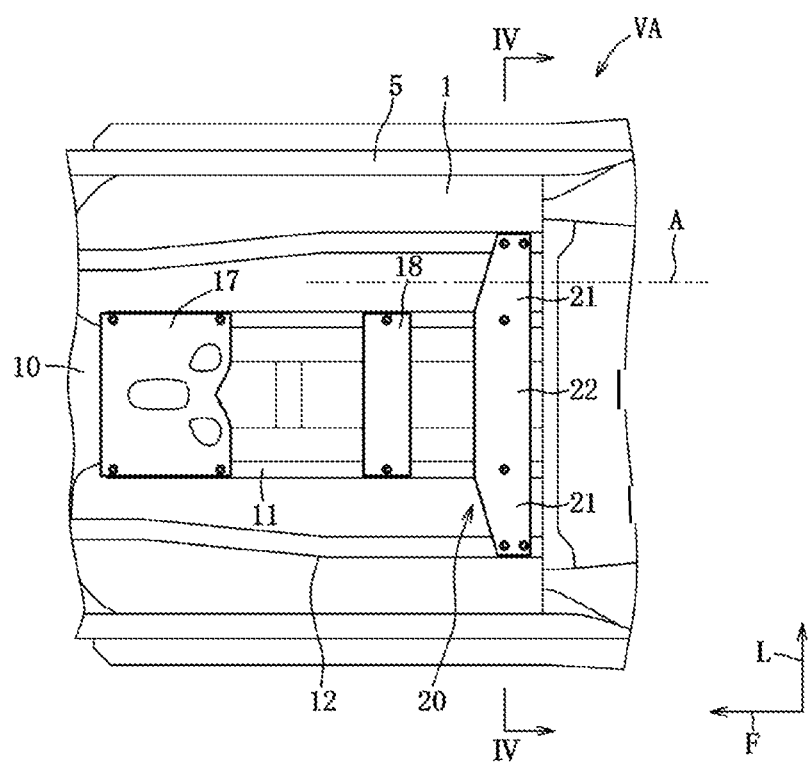
FIG. 3 is a partial bottom view of the vehicle.

As shown in FIGS. 1 and 3, the first brace member 17 is a steel-plate made reinforcing member (tunnel member) which interconnects the pair of right-and-left tunnel side frames 11 so as to cover a lower area of the tunnel portion 10 over a range from a front-end side portion of the tunnel side frame 11 to a position corresponding to the cross member 13. The second brace member 18 is a steel-plate reinforcing member which interconnects the pair of right-and-left tunnel side frames 11 so as to cover a lower area of the tunnel portion 10 around a position where the cross member 14 is arranged.

Next, the third brace member 20 will be described. As shown in FIGS. 1, 3-5, the third brace member 20 is a hexagonal plate-shaped reinforcing member which extends laterally so as to laterally connect respective bottom wall portions of the pair of right-and-left tunnel side frames 11 and respective bottom wall portions of the pair of right-and-left floor frames 12 as an attaching seat face. This third brace member 20 is made by forming (hot pressing, for example) the carbon fiber reinforced plastic (CFRP) where the carbon fiber is used as the reinforcing material. The carbon fiber is made of a fiber bundle where plural (12 k, for example) fibers (filaments) which continuously and uniformly extend in a longitudinal direction of the third brace member 20 over a range from one end, in the lateral direction, of the third brace member 20 to the other end are bundled. The diameter of a single fiber of the carbon fiber is 7-10 μm, for example. The thermosetting epoxy-based synthetic resin, for example, is used as a base material of the third brace member 20.

The third brace member 20 comprises a pair of right-and-left pentagonal band plate portions 21 (band plates) which interconnect the pair of tunnel side frames 11 and the pair of floor frames 12 and a rectangular connecting reinforcement portion 22 which connects respective inward end portions of the pair of band plate portions 21. The third brace member 20 is fixed to the vehicle body by fastening the pair of band plate portions 21 with bolts. Herein, since the pair of band plate portions 21 are configured to be symmetrical, the left band plate portion 21 will be described mainly.

Figure 4:
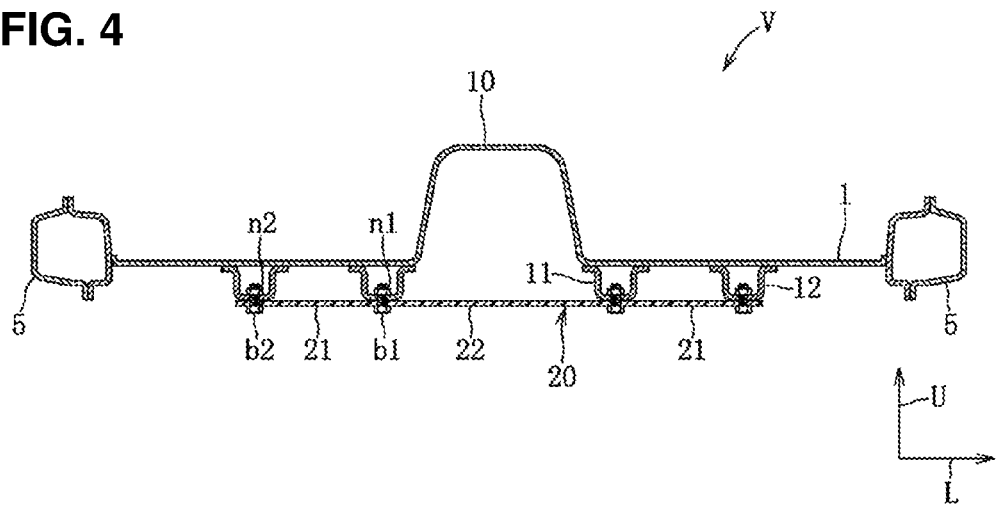
FIG. 4 is a sectional view taken along line IV-IV of FIG. 3.
Figure 5:
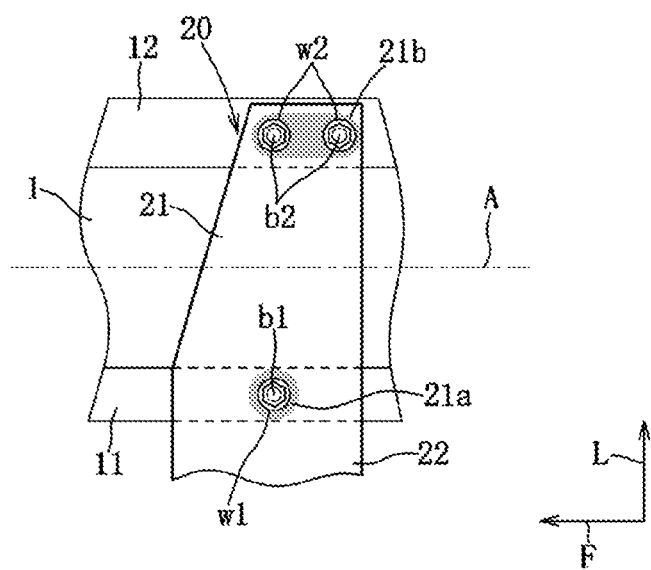
FIG. 5 is an enlarged view of a band plate portion.

As shown in FIG. 5, the left band plate portion 21 is configured such that the longitudinal length of its left end portion which overlaps the bottom wall portion of the floor fame 12 is shorter than that of its right end portion which overlaps the bottom wall portion of the tunnel side frame 11. As shown in FIGS. 4 and 5, a left end portion of the band plate portion 21 is fixedly fastened to a pair of nuts n2 which are provided at the bottom wall portion of the floor frame 12 with a pair of front-and-rear bolts b2 which are inserted into front-and-rear washers w2, and a right end portion of the band plate portion 21 is fixedly fastened to a nut n1 which is provided at the bottom wall portion of the floor frame 11 with a bolt b1 which is inserted into a washer w1. The bolt b1 and the washer w1 are arranged at a position, in the longitudinal direction, which corresponds to the front-side bolt b2 and washer w2. Thereby, the tensional stress between the bolts b1, b2 is decreased compared with a case where the bolt b1 and the washer w1 are arranged at a longitudinal position which corresponds to the rear-side bolt b2 and washer w2. Herein, the bolt b1 and the nut w1 correspond to a first pressing member, and the pair of bolts b2 and the pair of washers w2 correspond to a second pressing member.

Since a portion of the band plate portion 21 which contacts the washer w1 is pressed against the bottom wall portion of the tunnel side frame 11 by a pressing force of the bolt b1, a first displacement following portion 21a which is of a circular shape and configured to be displaced following to displacement of the tunnel side frame 11 is formed. Also, since respective portions of the band plate portion 21 which contact the pair of washers w2 and a middle portion of the band plate portion 21 which is interposed between the above-described respective portions are pressed against the bottom wall portion of the tunnel side frame 12 by pressing forces of the bolts b2, a second displacement following portion 21a which is of an oval shape and configured to be displaced following to displacement of the floor frame 12 is formed.

As shown in FIG. 5, the first displacement following portion 21a and the second displacement following portion 21b are configured to be asymmetrical relatively to a longitudinal direction axis A which passes through a middle point between the tunnel side frame 11 and the floor frame 12, and the longitudinal length of the second displacement following portion 21b is set to be longer than that of the first displacement following portion 21a. Thereby, when the vehicle body has a membrane-vibration mode, the out-of-plane deformation of the band plate portion 21 is suppressed, so that the torsional deformation which is larger than that of a portion of the floor panel 1 which corresponds to the band plate portion 21 is generated at the band plate portion 21. Moreover, since there is a tendency that the tensional stress and the torsional deformation are inversely proportional to each other, the torsional deformation can be further increased by decreasing the tensional stress. The torsional deformation of the band plate portion 21 is deformation around an imaginary torsional axis which is a line connecting the bolt b1 (washer w1) and the front-side bolt b2 (washer w2). The greater the difference in the longitudinal length between the first displacement following portion 21a and the second displacement following portion 21b is, the greater the torsional deformation is, so that the strain energy stored at the band plate portion 21 can be increased. Preferably, it is effective that the longitudinal length of the second displacement following portion 21b is set to be more than twice as long as the longitudinal length of the first displacement following portion 21a.

Next, operations and effects of the reinforcing structure of the vehicle body of the present embodiment will be described. Herein, the CAE (Computer Aided Engineering) analysis was conducted for deformation moves of the vehicle V in the membrane-vibration mode. The basic idea of this analysis will be described first. A structural analysis model of the vehicle V was set (prepared), and the vehicle-body moves in a normal vehicle's straight traveling where two pairs of front-and-rear suspensions became a vibration input source was calculated.

Figure 6:
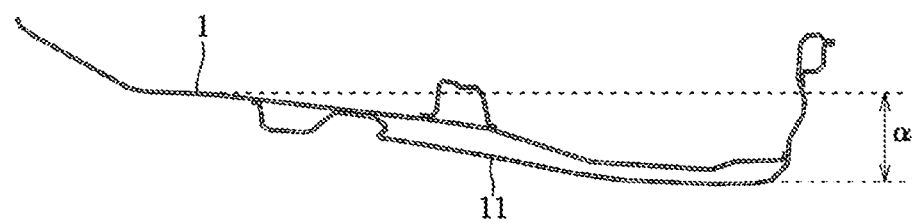
FIG. 6 is a longitudinal sectional view of a tunnel side frame, which shows an analysis result.
Figure 7:
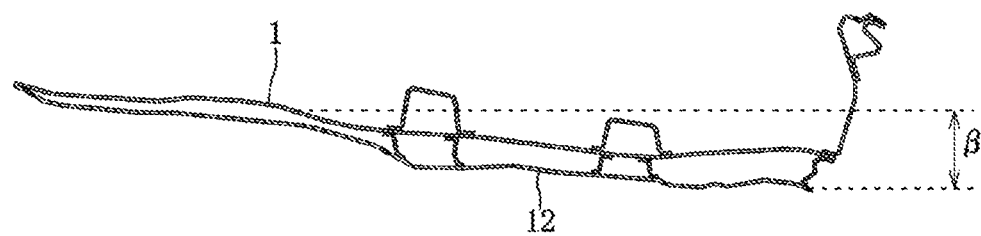
FIG. 7 is a longitudinal sectional view of a floor frame, which shows an analysis result.

The analysis result will be described referring to FIGS. 6 and 7. FIG. 6 shows a longitudinal sectional view of the tunnel side frame 11 in the maximum downward displacement, and FIG. 7 shows a longitudinal sectional view of the floor frame 12 in the maximum downward displacement. A changing angle of the tunnel side frame 11 was greater than that of the floor frame 12, and a displacement amount $\alpha$ of a rear end portion of the tunnel side frame 11 was greater than a displacement amount $\beta$ of a rear end portion of the floor frame 12. This may be because a rear end of the tunnel side frame 11 ends at a kick-up portion and the tunnel portion 10 has mouth opening (mouth closing) deformation. Consequently, it is found that a positional relationship of respective axes of the tunnel side frame 11 and the floor frame 12 when the vehicle body is deformed is a torsion state where the axes of the frames 11, 12 cross each other in the side view even if the axes of the frames 11, 12 are parallel to each other when the vehicle body is not deformed in a normal state. Therefore, the torsional deformation and the out-of-plane deformation occur in an area which corresponds to a position between the tunnel side frame 11 and the floor frame 12 at the floor panel 1.

According to the present reinforcing structure of the vehicle body, since the band plate portion 21 includes the first displacement following portion 21a which is configured to be displaced, following the displacement of the overlap portion of the tunnel side fame 11 which overlaps the inward end portion of the band plate portion 21, and the second displacement following portion 21b which is configured to be displaced, following the displacement of the overlap portion of the floor frame 12 which overlaps the outward end portion of the band plate portion 21, the deformation moves of the tunnel side frame 11 and the floor frame 12, in other words, the deformation move of the floor panel 1 which is connected to the tunnel side frame 11 and the floor frame 12 can be generated at the band plate portion 21. Since the first displacement following portion 21a and the second displacement following portion 21b are configured to be asymmetrical relatively to the longitudinal-directional axis A, the out-of-plane deformation (bending deformation) which is generated at the band plate portion 21, which is caused by an angular displacement of the tunnel side frame 11 and the floor frame 12, can be transferred to the torsional deformation, so that the strain energy which is stored at the band plate portion 21 can be increased. That is, by reducing a binding area for the tunnel side frame 11, the out-of-plane deformation as the bending deformation of the band plate portion 21 which is caused by the angular displacement of the tunnel side frame 11 and the floor frame 12 is decreased, so that the torsional deformation of the band plate portion 21 can be increased. Accordingly, the strain energy stored at the band plate portion 21 is increased, so that the vibration of the floor panel 1 (membrane-vibration mode) is damped.

Since the first and second displacement following portions 21a, 21b include the first and second pressing members b1, w1, b2, w2 which respectively press the inward and outward end portions of the band plate portion 21 against the tunnel side frame 11 and the second floor frame 12, the difference in the longitudinal length between the first and second displacement following portions 21a, 21b can be set to be properly large with a simple structure.

Since the longitudinal length of the second pressing member b2, w2 is set to be greater than that of the first pressing member b1, w1, the longitudinal length of the first displacement following portion 21a which is positioned on the inward side in the vehicle width direction and has the large angular displacement can be smaller than that of the second displacement following portion 21b, so that the torsional deformation of the band plate portion 21 can be increased, maintaining the structural superiority. Since the band plate portion 21 contains the plural carbon fibers as the reinforcing material which are provided to extend in the longitudinal direction (laterally) of the band plate portion 21 in the synthetic resin, the vibration damping performance can be improved, increasing the rigidity of the longitudinal direction of the band plate portion 21. Since the first frame is the pair of right-and-left tunnel side frames 11, and the second frame is the pair of right-and-left floor frames 12, the vibration damping of the floor panel 1 can be attained efficiently.

The pair of right-and-left band plate portions 21 are provided to respectively connect the pair of right-and-left tunnel side frames 11 and the pair of right-and-left floor frames 12 as the band plate portion, and integrally formed via the connecting reinforcement portion 22 which connects the respective inward end portions, in the vehicle width direction, of the band plate portions 21. Accordingly, by connecting the both end portions, in the vehicle width direction, of the tunnel portion 10, the membrane vibration mode of the floor panel 1 can be damped (reduced), suppressing an opening move, in the vehicle width direction, of the tunnel portion 10, which is caused by the vehicle-body torsional mode. Since the first pressing member is the bolt b1 and the washer w1, and the second pressing member is the pair of bolt members b2 and the pair of washers w2, the first and second pressing members can be constituted easily.

Embodiment 2

A third brace member 20A according to a second embodiment will be described referring to FIG. 8. Herein, the same members as the first embodiment are denoted by the same reference characters. While the left end portion of the band plate portion 21 of the first embodiment is fixedly fastened to the bottom wall portion of the band plate portion 21 with the pair of front-and-rear bolts b2 which are inserted into the pair of front-and-rear washers w2, a left end portion of the band plate portion 21A is fixedly fastened to the bottom wall portion of the floor frame 12 with a single bolt b2 which is inserted into a fixing metal tool w3.

The third brace member 20A comprises a pair of right-and-left band plate portions 21A and a connecting reinforcement portion 22 which interconnects respective inward end portions, in the vehicle width direction, of the pair of band plate portions 21A, which are integrated. Herein, since the pair of band plate portions 21A are configured to be symmetrical, the left-side band plate portion 21A will be described mainly.

Figure 8:
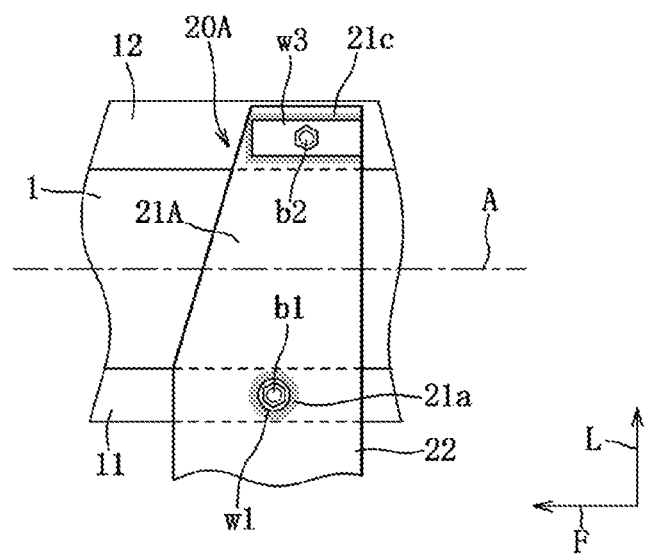
FIG. 8 is a view corresponding to FIG. 5 according to a second embodiment.

As shown in FIG. 8, the left end portion of the band plate portion 21A is fixedly fastened to a nut n2 which is provided at the bottom wall portion of the front frame 12 with the single bolt b2 which is inserted into a middle portion of the rectangular-shaped fixing metal tool w3 which has a longer length than a diameter of the washer w1, and the right end portion is fixedly fastened to a nut n1 which is provided at the bottom wall portion of the tunnel side frame 11 with the bolt b1 which is inserted into the washer w1. Herein, the bolt b1 and the washer w1 correspond to the first pressing member and the bolt b2 and the fixing petal tool w3 corresponds to the second pressing member.

Since a portion of the band plate portion 21A which contacts the washer w1 is pressed against the bottom wall portion of the tunnel side frame 11 by the pressing force of the bolt b1, the first displacement following portion 21a which is of the circular shape and configured to be displaced following to displacement of the tunnel side frame 11 is formed. Also, a portion of the band plate portion 21A which contacts the fixing metal tool w3 is pressed against the bottom wall portion of the floor frame 12 by the pressing force of the bolt b2, the second displacement following portion 21c which is of a roughly-rectangular shape and configured to be displaced following to displacement of the floor frame 12 is formed.

As shown in FIG. 8, the first and second displacement following portions 21a, 21c are configured to be asymmetrical relatively to the longitudinal-directional axis A which passes through the middle point between the tunnel side frame and the floor frame 12 and such that the longitudinal length of the second displacement following portion 21c is longer than that of the first displacement following portion 21a. Thereby, when the vehicle body has the membrane vibration mode, the larger torsional deformation than the torsional deformation of a portion of the floor panel 1 which corresponds to the band plate portion 21A is generated. The torsional deformation of the band plate portion 21A is deformation around an imaginary torsional axis which connects the bolt b1 and the bolt b2. According to the above-described structure, since the first pressing member is the bolt member b1 and the washer w1, and the second pressing member is the bolt member b2 and the fixing metal tool w3, the first and second pressing members can be made easily and provide the similar effects to the first embodiment with the smaller number of parts.

Embodiment 3

Next, a third brace member 20B according to the third embodiment 3 will be described referring to FIG. 9. Herein, the same members as the first embodiment are denoted by the same reference characters. While the first embodiment is configured such that the longitudinal length of the second displacement following portion 21b of the band plate portion 21 is longer than that of the first displacement following portion 21a, the third embodiment is configured such that the longitudinal length of a second displacement following portion 21e of a band plate portion 21B is set to be the same as that of a first displacement following portion 21d.

The third brace member 20B comprises a pair of rectangular band plate portion 21B and a connecting reinforcement portion 22 which interconnects respective inward end portions, in the vehicle width direction, of the pair of band plate portions 21B, which are integrated. Herein, since the pair of band plate portions 21B are configured to be symmetrical, the left-side band plate portion 21B will be described mainly.

Figure 9:
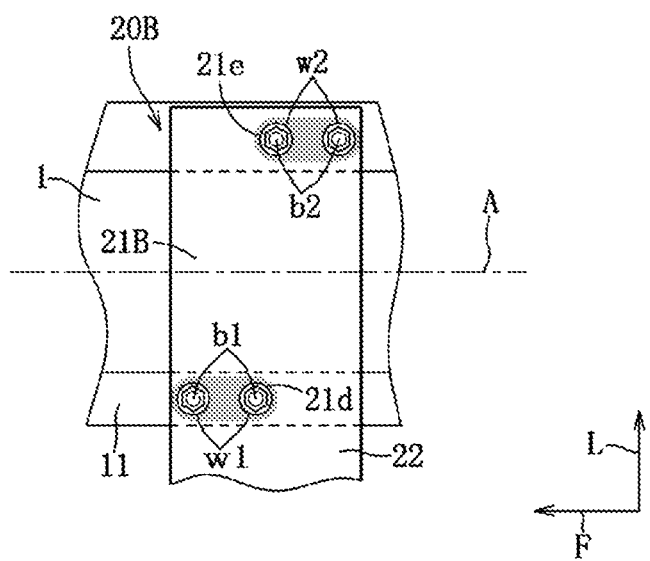
FIG. 9 is a view corresponding to FIG. 5 according to a third embodiment.
Figure 10:
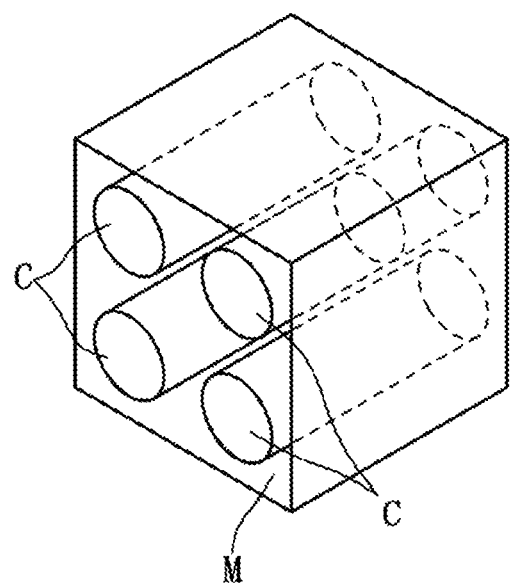
FIG. 10 is a partial enlarged view of carbon fiber reinforced plastic in a state before a torsional moment is applied.
Figure 11:
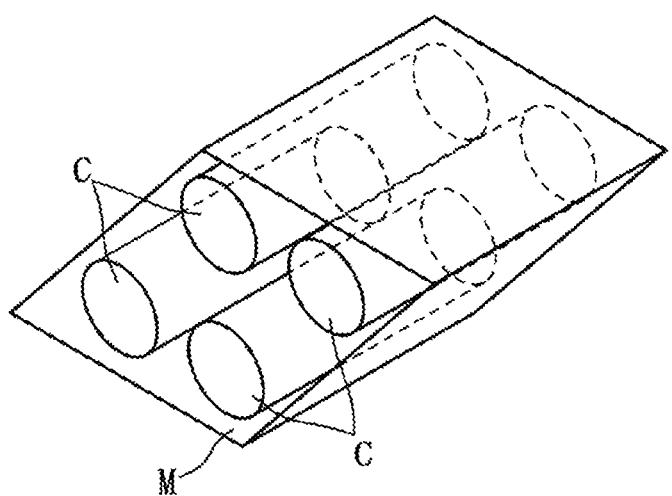
FIG. 11 shows a partial enlarged view of the carbon fiber reinforced plastic in a state after the torsional moment has been applied.

As shown in FIG. 9, the left end portion of the band plate portion 21B is fixedly fastened to a pair of nuts n2 which are provided at the bottom wall portion of the front frame 12 with a pair of front-and-rear bolts b2 which are inserted into a pair of front-and-rear washers w2, and the right end portion is fixedly fastened to nuts n1 which are provided at the bottom wall portion of the tunnel side frame 11 with a pair of front-and-rear bolts b1 which are inserted into a pair of front-and-rear washers w1. The rear-side bolt b1 and washer w1 are arranged at longitudinal-direction positions which correspond to the front-side bolt b2 and washer w2. Herein, the pair of bolts b1 and the pair of washers w1 correspond to the first pressing member and the pair of bolts b2 and the pair of washers w2 correspond to the second pressing member.

Since a portion of the band plate portion 21B which contacts the washers w1 is pressed against the bottom wall portion of the tunnel side frame 11 by a pressing force of the bolts b1, a first displacement following portion 21d which is of an oval shape and configured to be displaced following to displacement of the tunnel side frame 11 is formed. Also since a portion of the band plate portion 21B which contacts the pair of washers w2 is pressed against the bottom wall portion of the floor side frame 12 by a pressing force of the bolts b2, the second displacement following portion 21e which is of the oval shape and configured to be displaced following to displacement of the floor frame 12 is formed.

As shown in FIG. 9, the first and second displacement following portions 21d, 21e are provided to be offset, in the longitudinal direction, from each other, and the longitudinal length of the first displacement following portion 21d is set to be the same as that of the second displacement following portion 21e. Thereby, when the vehicle body has the membrane vibration mode, the larger torsional deformation than the torsional deformation of a portion of the floor panel 1 which corresponds to the band plate portion 21B is generated. The torsional deformation of the band plate portion 21B is deformation around an imaginary torsional axis which connects the rear-side bolt b1 and the front-side bolt b2. Herein, while the third embodiment describes an example where the rear-side bolt b1 and the front-side bolt b2 are adjacent to each other in the lateral direction, the first and second displacement following portions 21d, 21e may be configured such that the rear-side bolt b1 and the front-side bolt b2 are spaced apart from each other in the longitudinal direction.

Next, partial modifications of the above-described embodiments will be described.

1] While the above-described embodiments exemplify a case where the longitudinal length of the first displacement flowing portion positioned on the inward side, in the width direction, of the vehicle is set to be smaller than that of the outward side, in the width direction, of the vehicle, considering the structural superiority, the longitudinal length of the first displacement flowing portion positioned on the inward side, in the width direction, of the vehicle may be set to be larger than that of the outward side, in the width direction, of the vehicle as long as at least one of the displacement following portions is provided to cross the imaginary torsional axis. In this case, increasing the design flexibility can be attained and the same effects as the first or second embodiments can be provided from a perspective of vibration damping performance.

2] While the above-described embodiments exemplify a case where the first displacement following portion is positioned in front of the second displacement following portion in the case where the first and second displacement following portions have the same longitudinal length, the first displacement following portion may be positioned in back of the second displacement following portion as long as the first displacement following portion is located at an opposite side to the imaginary torsional axis. In this case, the same effects as the third embodiment can be provided from the perspective of the vibration damping performance.

3] While the above-described embodiments exemplify a case where the third brace member comprises the pair of right-and-left rectangular band plate portions and the connecting reinforcement portion which interconnects the respective inward end portions of the pair of band plate portions, which are formed integrally, and the third brace member contains carbon fibers uniformly extending in the longitudinal direction, any reinforcing material which is usable as a normal reinforcing material, such as talc or glass fiber, may be applicable as long as it is made from the synthetic resin containing any reinforcing material. Also, in a case where the carbon fiber is used as the reinforcing material, any of the long fiber and the short fiber is usable, and also the arrangement direction of the carbon fiber is not limited to the longitudinal direction as long as the strain energy can be stored by the torsional moment.

4] While the above-described embodiments exemplify a case where the tunnel side frames and the floor frames are respectively connected by the pair of right-and-left band plate portions, a band plate portion which connects the tunnel side frame and the side sill or connects the floor frame and the side sill may be provided. That is, in the vehicle which is provided with the tunnel portion and plural frames extending longitudinally, because the frame which is positioned on the inward side has the relatively large vertical vibration which is caused by the angular displacement, compared to the outward-positioned frame, the vibration damping performance can be provided by interconnecting the inward-positioned frame and the outward-positioned frame and configuring that the displacement following portion which is positioned on the outward side, in the width direction, of the vehicle is longer than the displacement following portion which is positioned on the inward side, in the width direction, of the vehicle. Further, since the change of the facial angle of the floor frame is smaller than that of the tunnel side frame and also the change of the facial angle of the side sill is smaller than that of the floor frame, the difference in the facial angle can be larger by the band plate portion connecting the tunnel side frame and the side sill, so that the torsional strain energy stored at the band plate portion can be further large. The pair of right-and-left band plate portions can be provided only, omitting the connecting reinforcement portion.

5] The present invention should not be limited to the above-described embodiments and any other modifications or improvements may be applied within the scope of a spirit of the present invention.

What is claimed is:
1. A reinforcing structure of a vehicle body, comprising:
a floor panel;
a tunnel portion provided to protrude toward a cabin at a middle portion, in a vehicle width direction, of the floor panel;
a pair of first frames provided to extend in a longitudinal direction on outward sides, in the vehicle width direction, of the tunnel portion;
a pair of second frames provided to extend in the longitudinal direction on outward sides, in the vehicle width direction, of the pair of first frames; and
a band plate which is made from synthetic resin and into which a reinforcing material is incorporated, an inward portion, in the vehicle width direction, of which being connected to one of the first frames which is positioned on one side in the vehicle width direction and an outward portion, in the vehicle width direction, of which being connected to one of the second frames which is positioned on one side in the vehicle width direction, wherein said band plate includes a first displacement following portion which is configured to be displaced, following displacement of an overlap portion of said first frame which overlaps said inward portion of the band plate, and a second displacement following portion which is configured to be displaced, following displacement of an overlap portion of said second frame which overlaps said outward portion of the band plate, and said first displacement following portion and said second displacement following portions are configured to be asymmetrical relatively to a longitudinal-directional axis.

2. The reinforcing structure of the vehicle body of claim 1, wherein said first and second displacement following portions include first and second pressing members which respectively press said inward and outward portions against said first and second frames.

3. The reinforcing structure of the vehicle body of claim 2, wherein a longitudinal length of said second pressing member is set to be greater than that of said first pressing member.

4. The reinforcing structure of the vehicle body of claim 3, wherein said band portion contains plural carbon fibers as said reinforcing material, which are arranged in the synthetic resin, extending in a longitudinal direction of the band plate.

5. The reinforcing structure of the vehicle body of claim 2, wherein said first and second displacement following portions are provided to be offset, in the longitudinal direction, from each other.

6. The reinforcing structure of the vehicle body of claim 5, wherein said band portion contains plural carbon fibers as said reinforcing material, which are arranged in the synthetic resin, extending in a longitudinal direction of the band plate.

7. The reinforcing structure of the vehicle body of claim 2, wherein said band portion contains plural carbon fibers as said reinforcing material, which are arranged in the synthetic resin, extending in a longitudinal direction of the band plate.

8. The reinforcing structure of the vehicle body of claim 1, wherein said first and second displacement following portions are provided to be offset, in the longitudinal direction, from each other.

9. The reinforcing structure of the vehicle body of claim 8, wherein said band portion contains plural carbon fibers as said reinforcing material, which are arranged in the synthetic resin, extending in a longitudinal direction of the band plate.

10. The reinforcing structure of the vehicle body of claim 1, wherein said band portion contains plural carbon fibers as said reinforcing material, which are arranged in the synthetic resin, extending in a longitudinal direction of the band plate.

11. The reinforcing structure of the vehicle body of claim 5, wherein said band portion contains plural carbon fibers as said reinforcing material, which are arranged in the synthetic resin, extending in a longitudinal direction of the band plate.

12. The reinforcing structure of the vehicle body of claim 1, wherein said first frames are a pair of right-and-left tunnel side frames, and said second frames are a pair of right-and-left floor frames.

13. The reinforcing structure of the vehicle body of claim 7, wherein said first frames are a pair of right-and-left tunnel side frames, said second frames are a pair of right-and-left floor frames, a pair of right-and-left band plates are provided to respectively connect said pair of right-and-left tunnel side frames and said pair of right-and-left floor frames as said band plate, and said pair of right-and-left band plates are integrally formed via a connection reinforcement portion which connects respective inward portions, in the vehicle width direction, of the band plates.

14. The reinforcing structure of the vehicle body of claim 4, wherein said first frames are a pair of right-and-left tunnel side frames, said second frames are a pair of right-and-left floor frames, a pair of right-and-left band plates are provided to respectively connect said pair of right-and-left tunnel side frames and said pair of right-and-left floor frames as said band plate, and said pair of right-and-left band plates are integrally formed via a connection reinforcement portion which connects respective inward portions, in the vehicle width direction, of the band plates.

* * * * *